Patented Aug. 14, 1923.

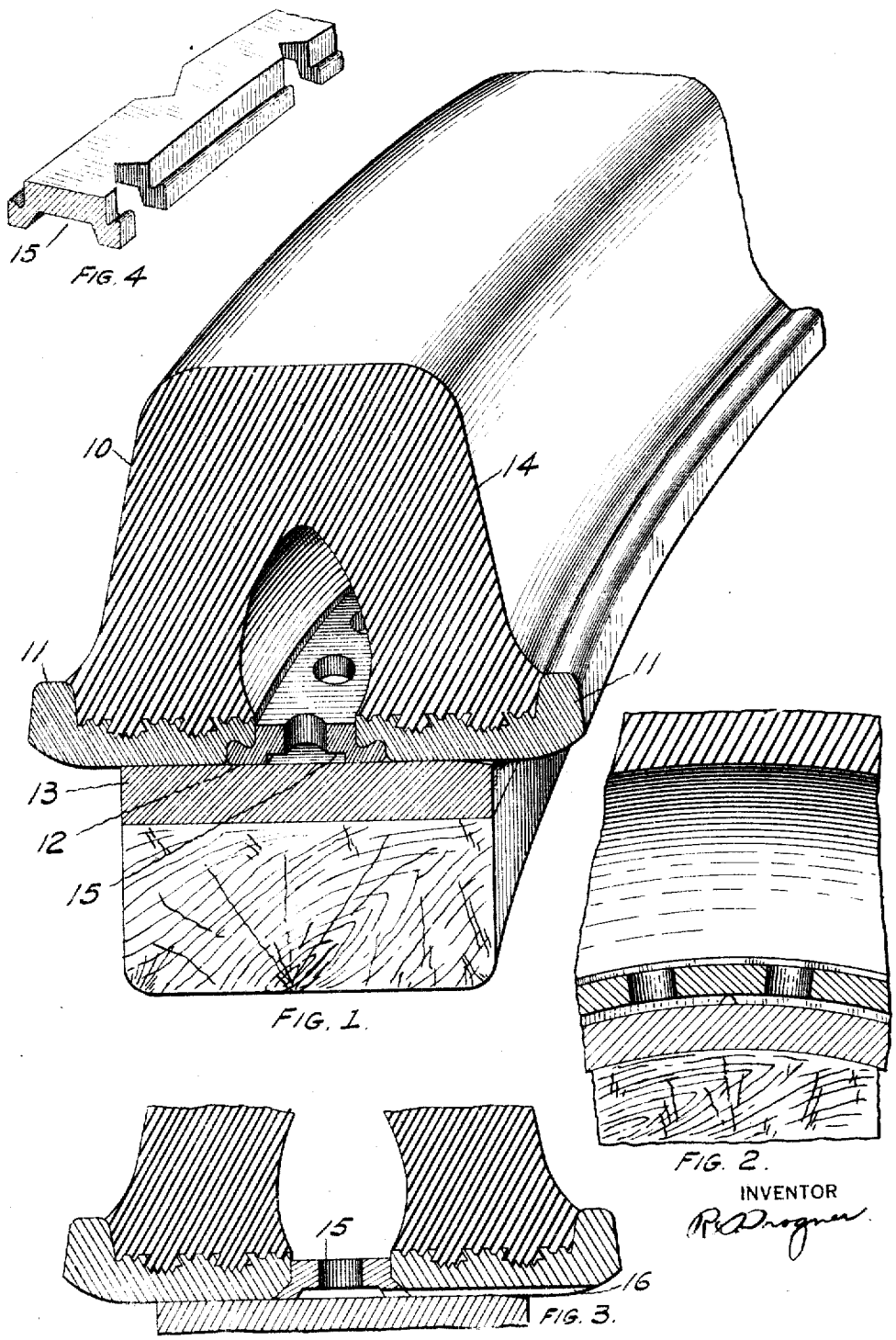

1,464,590

UNITED STATES PATENT OFFICE.

ROLAND S. TROGNER, OF AKRON, OHIO, ASSIGNOR TO THE GOODYEAR TIRE & RUBBER COMPANY, OF AKRON, OHIO, A CORPORATION OF OHIO.

VEHICLE TIRE.

Application filed January 26, 1923. Serial No. 615,159.

*To all whom it may concern:*

Be it known that I, ROLAND S. TROGNER, a citizen of the United States, and resident of Akron, Ohio, have invented new and useful Improvements in Vehicle Tires, of which the following is a specification.

My invention relates to vehicle tires and it particularly has reference to semi-pneumatic tires that embody an air space within the tire.

Semi-pneumatic tires having a metal base to which the material of the tire is permanently vulcanized and embodying an apertured center, have been in use for considerable time. In tires of this general type it has been found that the work that is performed on the material of the tire during its operation creates excessive internal heat that is transmitted to the air space and if this aperture is filled with dead air which is a very effective heat insulator, the temperature of the confined air may reach a point where it will continue the vulcanization of the rubber surrounding the aperture to such a degree as to greatly impair its resiliency and shorten its life.

The object of my invention is to provide means for ventilating or cooling the aperture that is formed inside of the tire for cushioning purposes and to thereby reduce the internal heat of the tire. This results in prolonging the life of the tire.

My invention contemplates the insertion of a ventilating ring between the rim sections of a semi-pneumatic tire of conventional construction that will operate to circulate the air within the tire.

Fig. 1 of the accompanying drawing is a cross-sectional view, shown in perspective, of a semi-pneumatic tire constructed in accordance with my invention and of the felloe-band on which the tire is mounted;

Fig. 2 is a side-sectional view of the tire and felloe band shown in Fig. 1;

Fig. 3 is a cross-sectional view of a semi-pneumatic tire, with parts broken away, showing a modified form of ventilator ring constructed in accordance with my invention; and Fig. 4 is a view in perspective, shown partially in section, of a further modification of the ventilator ring that is to be employed with tires of this general type.

The conventional tire shown in Fig. 1 embodies a resilient portion 10 of substantially U-shaped cross-section, having each arm of the U vulcanized to a rim part 11 that constitutes a portion of the tire. A ventilator ring 12 is interposed between the rim parts 11 and the assembled unit, comprising the resilient portion 10, the rim portion 11 and the ventilator ring 12 are mounted by hydraulic pressure on a felloe-band 13 in accordance with customary practice. All of the parts of this structure, with the exception of the ventilator ring 13 are of conventional design. The ventilator ring, however, embodies a series of apertures 14 that communicate with a circumferential channel 15 extending around the inner surface of the ring. These apertures and the communicating passages-way between the ventilator ring and the rim may be of any usual form that permits the movement of air through these openings during the operation of the tire. This movement of air or "breathing," as I shall hereafter designate it, is increased by forming a channel 16 that extends across one of the base members in 11 and which communicates with the inner channel 15 and with the outer air as shown in Fig. 3.

The forms of ventilator rings shown in Fig. 3 and in Fig. 4 are modified to meet the conditions imposed by slightly different type of tire base bands 11. The ventilator ring shown in Fig. 4 also embodies a series of notches that are formed along its marginal portions giving the desired communication from the dead air space formed within the tire to the channel 15 that extends outwardly from the ventilating ring between the rim base 11 and the felloe band.

The load that is imposed on a tire in service deflects the material of the tire and, as the tire progresses along the road, this continued deflection produces internal heating in the tire. If a ventilator ring of the type that I have described is employed between the base portions of a semi-pneumatic tire of this type, fresh air will be continuously breathing thru the channel 16 to the interior of the tire and this continued renewal and changing of air within the interior of the tire will materially reduce the temperature of the confined air-pocket that would otherwise prevail. This structure also more effectively and quickly transmits heat from the interior of the tire to the felloe-band which dissipates it.

The presence of the channel 16 is, in many instances, not essential to the successful operation of my device. This is particularly true in small sized tires where the heat that is developed within the cavity of the tire is first transmitted to the ventilator ring and thence conducted to the felloe-band 13, from which it is dissipated. The openings through the ventilator ring greatly increase the surface of metal that is exposed to the heated air of the cavity. The hot air thus reaches the felloe-band as well as both sides of the ventilator ring, which greatly increases the ability of the metal parts of the tire and felloe-band to dissipate the heat generated in the tire. Moreover the series of apertures formed in the ventilator ring have the effect of stirring up and changing the air that is enclosed in the cavity because of the air passages that they provide. This action is greatly increased by the continued pumping of the tire during its operation. In this way, a greater quantity of heat is dissipated through the circulation of the air than would result if a smooth ring were used between the base portions of the tire.

Although I have described only a single modification of my invention as applied to a particular class of semi-pneumatic tires, it is obvious that the invention is not so restricted and that it is capable of being applied to many other different types of tires. I desire therefore that only such limitations shall be imposed as are set forth in the appended claims.

What I claim is:

1. The combination of a semi-pneumatic tire having an internal air space and a pair of metal base members that are adapted to be mounted on a felloe-band of a ventilator ring interposed between said base members and provided with a series of apertures communicating with the air space of the tire and with an aperture formed in one of the base members that extends to the outer air.

2. The combination of a semi-pneumatic tire having an internal air spacing and a pair of metal base members that are adapted to be mounted on a felloe-band, of a ventilator ring interposed between said base members and adapted to space the same, said ring having a circumferential channel that communicates thru a plurality of apertures with the air space of the tire.

3. The combination with a semi-pneumatic tire having an internal air space, a felloe-band and a pair of metal base members integral with said tire that are adapted to be mounted on the felloe-band, one of said base members having a ventilating channel across its surface, of a ventilator ring, interposed between said base members and embodying a circumferential channel on the inner surface thereof that communicates with said ventilating channel and a plurality of apertures extending thru said ventilating ring and communicating with the apertured portion of said tire.

In witness whereof, I have hereunto signed my name in the presence of two subscribing witnesses.

ROLAND S. TROGNER.

Witnesses.
Wm. C. McCoy,
P. M. Hartman.